United States Patent [19]
Delfort et al.

[11] Patent Number: 5,985,805
[45] Date of Patent: Nov. 16, 1999

[54] COLLOIDAL THIO-PHOSPHOROUS PRODUCTS DERIVED FROM COLLOIDAL LIME, THEIR PREPARATION AND USES

[75] Inventors: Bruno Delfort, Paris; Maurice Born, Nanterre; Agnes Chive, Bourget, all of France

[73] Assignee: Institut Francais du Petrole, Malmaison, France

[21] Appl. No.: 08/965,490

[22] Filed: Nov. 6, 1997

Related U.S. Application Data

[63] Continuation-in-part of application No. 08/498,769, Jul. 6, 1995, Pat. No. 5,756,432.

[30] Foreign Application Priority Data

Jul. 6, 1994 [FR] France ................................. 94 08448
Jun. 11, 1996 [FR] France ................................. 96 13630

[51] Int. Cl.$^6$ ................... C10M 159/24; C10M 159/20; B01J 13/00
[52] U.S. Cl. ................... 508/349; 508/350; 508/391; 508/398; 516/33
[58] Field of Search .................... 508/349, 350, 508/391, 398; 252/306, 308, 309; 516/33

[56] References Cited

U.S. PATENT DOCUMENTS

| | | | |
|---|---|---|---|
| 2,451,346 | 10/1948 | McNab et al. | 508/349 |
| 2,465,902 | 3/1949 | McNab et al. | 508/349 |
| 2,483,270 | 9/1949 | Fischer | 508/349 |
| 3,655,558 | 4/1972 | Geyer et al. | 252/33 |
| 5,756,432 | 5/1998 | Born et al. | 508/391 |

FOREIGN PATENT DOCUMENTS

| | | |
|---|---|---|
| 0 691 395 | 1/1996 | European Pat. Off. . |
| 0 738 776 | 10/1996 | European Pat. Off. . |
| 2 645 168 | 10/1990 | France . |
| 2 698 018 | 5/1994 | France . |
| 598767 | 2/1948 | United Kingdom . |

*Primary Examiner*—Jerry D. Johnson
*Attorney, Agent, or Firm*—Millen, White, Zelano, & Branigan, P.C.

[57] ABSTRACT

Novel colloidal calcium thio-phosphorous products are described which can be obtained by a process comprising adding at least one phosphorus sulphide to colloidal lime in the presence of solvent, then heating the mixture, with stirring, then eliminating the solvent. These products can be used as anti-wear and extreme pressure additives in lubricating oils.

18 Claims, No Drawings

COLLOIDAL THIO-PHOSPHOROUS PRODUCTS DERIVED FROM COLLOIDAL LIME, THEIR PREPARATION AND USES

CROSS REFERENCE TO RELATED APPLICATION

This application is a continuation-in-part of application Ser. No. 08/498,769 filed Jul. 6, 1995, now U.S. Pat. No. 5,756,432 issued May 26, 1998, based on French application no. 94/08448 filed Jul. 6, 1994, upon which priority is claimed under 35 U.S.C. 119.

FIELD OF THE INVENTION

The present invention concerns novel colloidal thio-phosphorous products derived from colloidal lime, for use as anti-wear and extreme pressure additives in lubricating oils.

BACKGROUND OF THE INVENTION

There is a great deal of prior art describing the preparation of overbased colloidal products and the transformation of such products aimed at incorporating certain elements such as sulphur, phosphorus and/or boron into them.

Thus, for example, our French patent FR-B-2 645 168 describes thio-phosphorous compounds obtained by reacting at least one overbased compound with a phosphorus sulphide. The overbased compound can consist of an alkali or alkaline-earth metal salt of an acid such as a sulphonic acid, overbased by treating a reaction mixture containing that salt and at least one alkali metal or alkaline-earth metal oxide or hydroxide with a weak acid such as carbon dioxide. More particularly, the overbased compound can consist of a calcium sulphonate overbased by calcium carbonate. The overbased compound thus defined is reacted with a phosphorus sulphide such as $P_4S_7$, $P_4S_9$ or $P_4S_{10}$, generally used in a proportion of 0.002 to 0.15 moles of phosphorus per base equivalent.

We have now discovered that colloidal thio-phosphorous products with improved properties can be prepared from lime $Ca(OH)_2$ in a colloidal form rather than from an alkali or alkaline-earth metal carbonate.

Colloidal lime has been described in our French patent application FR-A-2 722 117.

The thio-phosphorous products of the invention can generally be defined by the fact that they are the result of carrying out a process comprising the following steps:
a) adding at least one phosphorus sulphide to colloidal lime in the presence of at least one volatile organic solvent;
b) heating with stirring to a temperature which can be, for example, up to the reflux temperature of the volatile solvent; and
c) eliminating the volatile solvent, for example using reduced pressure.

Colloidal lime can be prepared, for example, as described in French patent application FR-A-2 722 117 cited above, by reacting calcium oxide or hydride or calcium metal with water in an organic medium and in the presence of a surfactant, for example a calcium alkylarylsulphonate.

Organic media in which the colloidal lime can be formed in step a) are:
aliphatic hydrocarbons, such as hexanes or heptanes;
cycloaliphatic hydrocarbons, such as cyclohexane;
aromatic hydrocarbons, such as toluene or xylenes;
halogenated hydrocarbons, for example chlorinated hydrocarbons such as monochloro- or dichlorobenzene, or dichloro- or trichloroethane; or
heterocyclic compounds such as tetrahydrofuran.

The surfactant can be an alkylarylsulphonate of an alkali metal (sodium or potassium) or an alkaline-earth metal (magnesium, calcium or barium). It is usually a calcium alkylarylsulphonate. In the latter case, the alkylarylsulphonate can be formed in situ by reacting an alkylarylsulphonic acid with the calcium hydroxide formed in the medium.

The reaction can advantageously be carried out in the presence of a promoter, for example an aliphatic monoalcohol such as methanol. It can also be carried out in a mineral or synthetic diluting oil. The reaction temperature is generally in the range 0° C. to 80° C., normally in the range 5° C. to 45° C.

The colloidal lime prepared generally has a calcium content whice can be as much as about 35% by weight with respect to the active matter (core of the micelle constituted by calcium hydroxide+surfactant, excluding any diluting oil). The basicity reserve of the product in its diluted form in an oil at a concentration of 30% to 60% by weight of active matter corresponds to a TBN (Total Base Number) of about 100 to 500, normally 200 to 400 mg of potassium hydroxide per gram of product. The structure of the lime constituting the core of the micelle is confirmed by infra-red analysis.

Finally, the sulphur content of the product, which originates from the alkylarylsulphonate used as the surfactant, can be, for example, 1% to 5% by weight with respect to the active matter.

In step a) of the process for the production of thio-phosphorous products of the present invention, a phosphorus sulphide such as $P_4S_7$, $P_4S_9$ or $P_4S_{10}$, more particularly tetraphosphorus decasulphide $P_4S_{10}$, is added to the colloidal lime, for example in a proportion corresponding to a phosphorus to calcium atomic ratio of 0.1 to 2.5, preferably 0.5 to 2. The colloidal lime is generally in the form in which it is obtained from the process described in French patent application FR-A-2 722 117, i.e., the composition used comprises at least one surfactant, in general a calcium alkylarylsulphonate, a volatile organic liquid, more particularly selected from those mentioned above, and a diluting oil.

Then in step b), the reaction mixture is heated with stirring, for example to the reflux temperature of the volatile solvent.

In step c), it is heated under reduced pressure to eliminate the volatile solvent.

The products of the invention are colloidal products which are in the form of inverse micelles (water-in-oil), for example at a concentration of 30% to 60% in the diluting oil used. At these concentrations, they can have a sulphur content of 1% to 15% by weight and a phosphorus content of 0.2% to 7% by weight.

They are soluble and stable in both mineral and synthetic lubricating oils, in which they can be used as anti-wear and extreme pressure additives. To this end, they can be used at concentrations of 0.5% to 20% by weight, preferably 1% to 5% by weight, for example.

The following examples illustrate the invention without limiting its scope.

EXAMPLES

Examples A and B describe the preparation of the colloidal compositions used in Examples 1 and 2.

Example A

Synthesis of Colloidal Lime 88 g of an alkylarylsulphonic acid with an equivalent average molar mass of 700, 350 ml of toluene, 15 ml of methanol and 80 g of a 130 Neutral mineral oil were introduced into a reactor provided with a stirrer and a dropping funnel. 60 g (1.43 moles) of calcium hydride $CaH_2$ was dispersed in this medium. The dropping funnel was used to introduce a solution of 44.9 g (2.49 moles) of water in 155 ml of tetrahydrofuran over 5 hours at a temperature which did not exceed 20° C., with stirring. The medium was kept at this temperature for 3 hours. After filtering, the solvent was eliminated under reduced pressure. A homogeneous product was obtained which contained 16.3% by weight of calcium and 2.3% by weight of sulphur. The composition is shown in Table 1.

Example B
Synthesis of Colloidal Calcium Carbonate 40.3 g of an alkylarylsulphonic acid containing 70% by weight of active matter and 30% by weight of diluting oil and with an equivalent molar mass of 700, 200 ml of xylene, 55 ml of methanol and 39.5 g of a 130 Neutral mineral oil solvent were introduced into a reactor. 23 g (0.31 moles) of lime $Ca(OH)_2$ was dispersed in this medium and 10 g (0.227 moles) of carbon dioxide was bubbled in over 2 hours with vigorous stirring, at a temperature not exceeding 40° C. The residual solid phase was eliminated by filtering, then the volatile solvents and the water formed during the reaction were eliminated by evaporation under reduced pressure. 92 g of a homogeneous, liquid product was obtained. Its composition is shown in Table 1.

Table 1 below shows the composition of the colloidal substrates used in Examples A and B.

TABLE 1

| Composition | Colloidal particles | | Surfactant* | Oil |
|---|---|---|---|---|
| Example | Nature | (% by wt) | (% by wt) | (% by wt) |
| A | $Ca(OH)_2$ | 25.1% | 25.1% | 49.8% |
| B | $CaCO_3$ | 22.8% | 26.0% | 51.2% |

*Calcium alkylarylsulphonate.

Example 1 below illustrates the invention. Examples 2 and 3 are given by way of comparison.

Example 1

26.7 g of colloidal lime $Ca(OH)_2$ prepared as described in Example A, 2 g of tetraphosphorus decasulphide $P_4S_{10}$ and 150 ml of xylene were introduced into a reactor. The medium was stirred and kept at 30° C. for 5 hours then heated to the reflux temperature of xylene for one hour. After evaporating off the xylene under reduced pressure, 27.1 g of a homogeneous viscous product with the following characteristics was obtained:

| Ca | 14.1% by weight |
|---|---|
| P | 2.1% by weight |
| S | 7.0% by weight |

Example 2
(comparative)

26.7 g of colloidal calcium carbonate $CaCO_3$ prepared as described in Example B, 2 g of tetraphosphorus decasulphide P4S10 and 150 ml of xylene were introduced into a reactor. The medium was stirred and kept at 30° C. for 5 hours then heated to the reflux temperature of xylene for one hour. After evaporating off the xylene under reduced pressure, 27 g of a homogeneous viscous product with the following characteristics was obtained:

| Ca | 8.9% by weight |
|---|---|
| P | 2.0% by weight |
| S | 4.1% by weight |

Example 3
(comparative)

Example 1 was reproduced, replacing the 26.7 g of colloidal lime with a mixture constituted by non colloidal lime $Ca(OH)_2$ dispersed by the same surfactant in the same diluting mineral oil used to prepare the colloidal lime described in Example A; the proportions of these three constituents in the mixture were the same as for the product of Example A.

Under these conditions, 23 g of a product with the following characteristics was obtained:

| Ca | 2.5% by weight |
|---|---|
| P | 1.6% by weight |
| S | 4.0% by weight |

Example 4
Comparative Examination of Chemical Conversion of Phosphorus Sulphide in Examples 1, 2 and 3

The chemical conversion of phosphorus was calculated by comparing the mass of phosphorus provided by 2 g of $P_4S_{10}$ and that determined in the colloidal product, i.e., the product of the mass of colloidal product multiplied by the weight percentage of the phosphorus analysed.

The chemical conversion of sulphur was calculated in identical manner to that of phosphorus, also taking into account the quantity of sulphur due to the surfactant present in each of the colloidal products considered.

The results are shown in table 2 below:

TABLE 2

| Product from Example | Conversion P (%) | Conversion S (%) |
|---|---|---|
| 1 | 100 | 100 |
| 2 | 100 | 54 |
| 3 | 65 | 33 |

In Examples 1 and 2, all of the phosphorus provided by 2 g of $P_4S_{10}$ was converted to the colloidal product, while 100% of the sulphur was converted with the colloidal lime of Example 1 as against only 54% with the colloidal calcium carbonate of Example 2. In Example 3, the respective conversions of sulphur and of phosphorus provided by $P_4S_{10}$ were incomplete.

The preceding examples can be repeated with similar success by substituting the generically or specifically described reactants and/or operating conditions of this invention for those used in the preceding examples.

The entire disclosure of all patents and publications, cited above and below, and of corresponding French application 96/13.630, are hereby incorporated by reference.

From the foregoing description, one skilled in the art can easily ascertain the essential characteristics ofthis invention, and without departing from the spirit and scope thereof, can make various changes and modifications of the invention to adapt it to various usages and conditions.

We claim:

1. A colloidal thio-phosphorous product derived from colloidal lime, characterized in that it is obtained by a process comprising the following steps:

a) adding at least one phosphorus sulphide to colloidal lime in a volatile organic solvent said colloidal lime being constituted by calcium hydroxide $Ca(OH)_2$ held in colloidal suspension in the form of inverse micelles in an oil by means of a surfactant;

b) heating with stirring; and c) eliminating the solvent.

2. A colloidal thio-phosphorous product according to claim 1, characterized in that said surfactant is a calcium alkylarylsulphonate.

3. An anti-wear and extreme pressure additive comprising a colloidal thiophosphorous product according to claim 2 in a mineral or synthetic mineral oil, in a concentration of 0.5% to 20% by weight.

4. A colloidal thio-phosphorous product according to claim 1 characterized in that in step a), the phosphorus sulphide is $P_4S_7$, $P_4S_9$ or $P_4S_{10}$.

5. An anti-wear and extreme pressure additive comprising a colloidal thiophosphorous product according to claim 4 in a mineral or synthetic mineral oil, in a concentration of 0.5% to 20% by weight.

6. A colloidal thio-phosphorous product according to claim 1, characterized in that in step a), the phosphorus sulphide is $P_4S_{10}$.

7. An anti-wear and extreme pressure additive comprising a colloidal thiophosphorous product according to claim 6 in a mineral or synthetic mineral oil, in a concentration of 0.5% to 20% by weight.

8. A colloidal thio-phosphorous product according to claim 1, characterized in that in step a), the phosphorus sulphide is used in a proportion corresponding to a phosphorus to calcium atomic ratio of 0.1 to 2.5.

9. An anti-wear and extreme pressure additive comprising a colloidal thiophosphorous product according to claim 8 in a mineral or synthetic mineral oil, in a concentration of 0.5% to 20% by weight.

10. A colloidal thio-phosphorous product according to claim 1, characterized in that in step a), the phosphorus sulphide is used in a proportion corresponding to a phosphorus to calcium atomic ratio of 0.5 to 2.

11. An anti-wear and extreme pressure additive comprising a colloidal thiophosphorous product according to claim 10 in a mineral or synthetic mineral oil, in a concentration of 0.5% to 20% by weight.

12. A colloidal thio-phosphorous product according to claim 1, characterized in that in step a), the volatile solvent is an aliphatic hydrocarbon, a cycloaliphatic hydrocarbon, an aromatic hydrocarbon, a halogenated hydrocarbon or a heterocyclic compound.

13. A colloidal thio-phosphorous product according to claim 1, characterized in that in step b), heating is carried out at a temperature of up to the reflux temperature of the volatile solvent.

14. A colloidal thio-phosphorous product according to claim 1, characterized in that it is in the form of water-in-oil inverse micelles and has a sulphur content of 1% to 15% by weight and a phosphorus content of 0.2% to 7% by weight.

15. An anti-wear and extreme pressure additive comprising a colloidal thiophosphorous product according to claim 14 in a mineral or synthetic mineral oil, in a concentration of 0.5% to 20% by weight.

16. An anti-wear and extreme pressure additive comprising a colloidal thio-phosphorous product according to claim 1 in a mineral or synthetic mineral oil, in a concentration of 0.5% to 20% by weight.

17. A colloidal suspension in the form of water-in-oil inverse micelles, said suspension having a sulphur content of 1% to 15% by weight, a phosphorus content of 0.2% to 7% by weight, and a calcium content corresponding to a phosphorus to calcium atomic ratio of 0.1 to 2.5.

18. An anti-wear and extreme pressure additive comprising a colloidal thiophosphorous product according to claim 17 in a mineral or synthetic mineral oil, in a concentration of 0.5% to 20% by weight.

\* \* \* \* \*